Patented Apr. 10, 1945

2,373,240

UNITED STATES PATENT OFFICE 2,373,240

CONTROLLED OXIDATION OF UNSATURATED HALIDES

Harry de V. Finch, Berkeley, and Seaver A. Ballard, Oakland, Calif., assignors to Shell Development Company, San Francisco, Calif., a corporation of Delaware No Drawing. Application May 10, 1943, Serial No. 486,458

13 Claims. (Cl. 260—539)

This invention relates to the controlled oxidation of unsaturated halides, and more particularly pertains to the catalytic controlled oxidation of halogenated unsaturated hydrocarbons to produce valuable oxygenated products, such as the halogenated unsaturated carboxylic acids, ketones, keto-acids, and the like, which contain the same number of carbon atoms per molecule as the primary material treated. In one of its more specific embodiments, the present invention is directed to the catalytic oxidation of mono-halo-substituted unsaturated hydrocarbons containing an olefinic linkage between two carbon atoms of aliphatic character to produce halogenated unsaturated carboxylic acids, ketones, keto-acids, and the like, having the same number of carbon atoms per molecule as the unsaturated halogenated hydrocarbon subjected to oxidation.

The oxidation of various organic compounds has been effected for a number of years both non-catalytically and in the presence of catalysts. As a general rule, most if not all of these oxidations resulted in considerable degradation, i. e. cleavage of the carbon-to-carbon bonds of the organic starting material. Also, the products of reaction of such oxidations usually contained various percentages of hydrocarbons which had been oxidized to a greater or lesser extent. For instance, the catalytic oxidation of aliphatic hydrocarbons, whether they be saturated or unsaturated, in accordance with the teachings of the prior art, formed mixtures containing various precentages of aldehydes, alcohols, acids, acetals, esters, ketones and other oxygenated compounds. These various oxygenated compounds contained varied numbers of carbon atoms per molecule due to the aforementioned carbon-to-carbon scission as well as to other side reactions, such as polymerization or condensation. Furthermore, the oxidation of unsaturated hydrocarbons, when effected according to the prior art processes, was practically always accompanied by decomposition so that the resultant reaction products predominated in compounds containing a lesser number of carbon atoms per molecule than the starting organic material treated.

Although most of the oxygenated organic compounds formed as a result of the partial oxidation of hydrocarbons according to the known processes are generally more valuable than the primary materials subjected to such oxidation, it is frequently desirable to obtain predominantly carboxylic acids, keto-acids, and/or ketones rather than mixtures containing large amounts of various more or less oxygenated substances. Also, it is often desirable to obtain oxygenated compounds having the same number of carbon atoms per molecule as the starting material treated. Finally, it is desirable to obtain halogenated unsaturated carboxylic acids from halogenated unsaturated hydrocarbons, and particularly halogenated unsaturated carboxylic acids and/or halogenated keto-acids containing the same number of carbon atoms per molecule as the primary organic material treated, rather than the aforesaid mixtures predominating in saturated oxygenated products containing varied numbers of carbon atoms per molecule.

It is the main object of the present invention to provide a novel process whereby predetermined halogenated unsaturated and/or saturated oxygenated compounds may be obtained. Another object is to provide a process for the production of halogenated unsaturated carboxylic acids. Still another object is to provide a process whereby unsaturated halides, and more particularly mono-halo-substituted unsaturated hydrocarbons containing an olefinic linkage between two carbon atoms of aliphatic character, may be catalytically and directionally treated to produce economic yields of the corresponding halogenated unsaturated carboxylic acids, as well as other valuable oxygenated compounds, such as the keto-acids and ketones, having the same number of carbon atoms per molecule as the halo-substituted unsaturated starting material.

The term "ketone," as employed herein, refers to organic compounds having one or more carbonyl groups, and therefore includes diketones.

It has now been discovered that the above and other objects may be attained by effecting the partial oxidation of the specified halo-substituted unsaturated hydrocarbons in the presence of hydrogen bromide. More specifically stated, the invention resides in the partial and controlled oxidation of halo-substituted unsaturated hydrocarbons, and particularly of the halo-substituted unsaturated hydrocarbons containing an olefinic linkage between two carbon atoms of aliphatic character, in the presence of a catalyst consisting of or comprising hydrogen bromide, or of a compound capable of yielding hydrogen bromide under the operating conditions. In one of its more specific embodiments, the present invention resides in the production of halogenated unsaturated carboxylic acids and/or of halogenated keto-acids and/or ketones, by the controlled oxidation of halogenated hydrocarbons containing at least one double bond, by subjecting the starting organic material, in the presence of hydrogen bromide, or of a substance capable of yielding hydrogen bromide under the operating conditions, to the action of oxygen under temperature and pressure conditions which are below those capable of causing the spontaneous combustion and therefore decomposition of the carbon structure of the starting halogenated unsaturated hydrocarbon.

The above-outlined invention is predicated on the discovery that the presence of hydrogen bromide, during the oxidation of the above-mentioned and hereinbelow more fully described halogenated unsaturated hydrocarbons (particularly when the reaction is effected in the vapor phase and under the hereinbelow outlined operating conditions), controls the oxidation reaction so as to cause the oxygen to react with a saturated carbon atom instead of affecting the unsaturated or double bond of the starting organic material. Also, the use of the hydrogen bromide catalyst, at least in some cases causes a rearrangement as is indicated by the formation of beta-brom-acrylic acid from allyl bromide. Furthermore, the presence of the hydrogen bromide, besides retarding the explosion or complete combustion of the starting material, i. e. the halogenated unsaturated hydrocarbon of the class defined herein, apparently inhibits decomposition of the carbon structure of such starting material, so that the resultant mixture predominates in halogenated unsaturated caboxylic acids and/or keto-acids and/or ketones containing the same number of carbon atoms per molecule as the starting organic material subjected to oxidation in accordance with the process of the present invention.

The halogenated unsaturated hydrocarbons which may be oxidized to the corresponding unsaturated carboxylic acids, keto-acids and/or ketones, which keto-acids and ketones may or may not be saturated, are characterized by containing in their structure one or more halogen atoms and one or more unsaturated linkages, preferably olefinic linkages, between two carbon atoms of aliphatic character. The halogen atom or atoms in these halogenated unsaturated hydrocarbons may be attached to the saturated and/or unsaturated carbon atoms. Preferably, the starting material should contain at least one saturated carbon atom to which a replaceable hydrogen atom is attached. The halogenated unsaturated hydrocarbons may contain the olefinic linkage either in an open alkenyl chain or in a cycloalkenyl ring. Representative halogenated organic compounds which may be oxidized in accordance with the process of the present invention to produce halogenated unsaturated carboxylic acids, keto-acids, ketones, and the like are: allyl chloride, allyl bromide, crotyl chloride, crotyl bromide, 2-chlorbutene-2, 2-brom-butene-2, methyl vinyl carbinyl chloride, methallyl chloride, ethyl vinyl carbinyl chloride, isopentenyl chlorides, 4-chlorbutent-1, 5-chlor-pentene-1, 5-chlor-pentene-2, 4-chlor-pentene-2, 1-chlor-cyclopentene-2, 1-brom-cyclopentene-2, 4-methyl-1-chlor-cyclopentene-2, 1-chlor-cyclohexene-2, 2,3-dibrom-cyclohexene-3, 1,4-dichlor-butene-2, 3,4-dichlor-butene-1, and the like, and their homologues and analogues, as well as suitable substitution products. In this connection it must be noted that the halogenated unsaturated hydrocarbons which contain a saturated terminal carbon atom, particularly when such atom is attached directly to an unsaturated carbon, when subjected to the controlled oxidation according to the present process tend to produce halogenated unsaturated carboxylic acids (or, in some cases, saturated keto-acids, e. g. mono-halo-pyruvic acid); whereas halogenated unsaturated hydrocarbons which do not have such a terminal methyl radical, e. g. in the case of a halogenated pentadiene-1,4, when subjected to the oxidation tend to form oxygenated compounds predominating in or containing ketonic compounds.

The non-explosive, controlled oxidation of the above-described class of halogenated unsaturated hydrocarbons is effected in accordance with the process of the present invention at elevated temperatures which are below those at which spontaneous combustion or substantial degradation or decomposition of the carbon structure of the starting material occurs. This upper temperature will at least in part depend on the specific halogenated unsaturated hydrocarbon treated, as well as on the proportions thereof and/or of the oxygen and hydrogen bromide present in the mixture subjected to the elevated temperatures. For instance, generally speaking, other conditions being equal an increase in the hydrogen bromide content of a mixture will usually lower the temperature at which spontaneous combustion will occur. Also, it must be noted that excessively high temperatures, even though they may be below the explosive region of the mixture, should be avoided because of certain undesirable side reactions, such as excessive reaction of the starting material with the hydrogen bromide to form organic polyhalides. Generally, it may be stated that, for the lower boiling halogenated unsaturated hydrocarbons, the upper temperature limit is in the neighborhood of 225° C. to 250° C., although with shorter contact periods this temperature may be raised somewhat higher. Some of the more readily oxidizable halogenated unsaturated hydrocarbons may be economically oxidized in accordance with the present process at temperatures as low as about 175° C. With further decrease in the operating temperature the output of the oxidized product per unit of time will decrease so that at temperatures of below about 100° C. the controlled oxidation in the presence of the aforementioned catalyst may become uneconomical.

The reaction may be effected in the liquid or vapor phase, or in a two-phase liquid-vapor system. Since it is generally difficult to maintain a desirable relatively high oxygen concentration when the reaction is conducted in the liquid phase, it is usually preferred to effect the oxidation reaction in the vapor state. Some of the relatively higher boiling unsaturated halides cannot be effectively maintained in the vapor state and in contact with sufficient concentrations of oxygen and of the hydrogen bromide without causing the spontaneous combustion of such mixture. The oxidation of such unsaturated halides of the defined class may be readily effected in the presence of inert diluents or carriers such as steam, nitrogen, carbon dioxide and even methane, which latter is relatively stable at the temperatures at which the above-mentioned halogenated unsaturated hydrocarbons may be oxidized effectively according to the present invention. Although nitrogen is a highly suitable diluent, the use of steam is generally considered to be most advantageous because the hydrogen bromide may then be removed from the reaction mixture as an overhead fraction in the form of its constant boiling mixture of the hydrogen bromide and water.

The volumetric ratios of oxygen to the unsaturated halide may vary within relatively wide limits. It may generally be stated that satisfactory yields of the desired oxygenated product or products may be obtained by using at least equivolumetric quantities of these two substances. An increase in the amount of oxygen in the treated mixture usually increases the yield of the desired unsaturated carboxylic acids.

However, any undue increase in the ratio of oxygen to the halogenated unsaturated hydrocarbon is generally dangerous because of excessive explosion hazards. On the other hand, the use of ratios which are considerably below equivolumetric will normally lower the output of the desired product or products per unit of time because of the presence of less oxygen per unit of space. This renders the process less economical, although operable. It must be noted that the lowering of the oxygen-to-unsaturated halide ratio usually causes a faster consumption of the oxygen per unit of time. Since the hydrogen bromide apparently acts as an explosion retardant or inhibitor, it is possible to employ mixtures containing excess quantities of oxygen. This in turn results in the production of higher yields of the desired oxygenated product or products.

The amount of hydrogen bromide employed as the catalyst may also vary within relatively wide limits, although optimum amounts or percentages may be readily determined for each individual starting material treated and for the specific operating conditions employed. Generally, the percentage of oxygen which will react to form the desired oxygenated product or products will vary with a change in the hydrogen halide concentration in the mixture subjected to treatment. This is particularly true with lower hydrogen bromide concentrations. Very high hydrogen bromide concentrations will cause excessive dilution and thus decrease the output of the desired product or products. Such excessively high hydrogen bromide concentrations should therefore be avoided for economic reasons.

The oxidation in accordance with the process of the present invention may be effected at atmospheric pressures although higher or lower pressures may also be employed. In fact, it is generally preferable to use superatmospheric pressures because more of the mixture subjected to treatment may be conveyed through a given unit of reaction space per unit of time.

The invention may be executed in a batch, intermittent or continuous manner. When operating in a continuous system all of the reactants as well as the diluents, if any of the latter are used, and the catalyst may be first mixed, and the mixture then conveyed through the whole length of the reaction zone. In the alternative, it is possible to introduce at least a part of the catalyst and/or of one or both of the reactants, i. e. oxygen and the unsaturated halide, at various points along the reaction zone. Such operation may frequently be desirable to control the operating conditions, e. g. temperature, in the reaction zone.

The residence time of the reactants in the reaction zone may also vary, and is dependent at least in part on the other operating conditions, such as the specific halogenated unsaturated hydrocarbon treated, the ratio thereof to the oxygen and/or catalyst, the presence or absence of inert diluents, the operating temperatures and pressures, etc. In a continuous system it has been found that satisfactory yields of the desired halogenated unsaturated carboxylic acids, keto-acids and/or of the ketones may be obtained with space velocities of between about 12 and about 20, although higher or lower space velocities may also be used. The term "space velocity" as employed herein refers to the volume of the vapors of the halogenated unsaturated hydrocarbon conveyed through a unit volume of reaction space per hour.

Instead of using individual halogenated unsaturated hydrocarbons, e. g. mono-halo-substituted unsaturated hydrocarbons, whether they be aliphatic or alicyclic, and whether they contain one or more olefinc linkages between two carbon atoms of aliphatic character, it is also possible to use mixtures of such substituted unsaturated hydrocarbons. Also instead of employing pure or substantially pure oxygen for the oxidation in accordance with the present process, it is possible to employ oxygen-containing mixtures, such as air, or even substances capable of yielding molecular oxygen under the operating conditions. Furthermore, although the examples presented hereinbelow are directed specifically to the use of hydrogen bromide as the catalyst, the process of the present invention may be realized by using substances capable of yielding the hydrogen bromide under the operating conditions employed.

The invention is illustrated by the following specific examples, it being understood that there is no intention of being limited by any details thereof, since many variations may be made within the scope of the claimed invention.

*Example I*

A Pyrex glass reactor was employed and was provided with an oil bath to maintain the reactants at a constant and desired temperature throughout the reaction. A vaporous mixture consisting of one part by volume of allyl bromide, four parts by volume of oxygen, four parts by volume of nitrogen (used as the diluent and carrier for the allyl bromide), and two parts by volume of hydrogen bromide, was conveyed through the reactor at a space velocity of about 15.5. The reaction temperature was maintained at about 194° C. An analysis of the reaction products indicated that about 32% of the allyl bromide was converted to organic acids, mainly beta-bromacrylic acid, while about 24% of the introduced allyl bromide was converted to carbonylic compounds containing bromo-ketone.

*Example II*

A vaporous mixture consisting of one part by volume of 2-chlor-butene-2, four parts by volume of oxygen, four parts by volume of nitrogen, and two parts by volume of hydrogen bromide, was conveyed at a space velocity of about 17, through the above-mentioned Pyrex glass reactor maintained at a temperature of between about 220° C. and about 225° C. An analysis of the reaction products indicated that about 31% of the introduced 2-chlor-butene-2 was converted to organic acids, and the about 4% of the 2-chlor-butene-2 was converted to diacetyl. The organic acid fraction contained about 28.7% chlorine, had a melting point of 58° C., an equivalent weight of 121, and an ionization constant of $1 \times 10^{-4}$, thus indicating that it predominated in chlor-crotonic acid (theoretical: 29.4% chlorine, melting point—61° C., equivalent weight—120.5, and an ionization constant—$1.4 \times 10^{-4}$).

*Example III*

A vaporous mixture consisting of one part by volume of allyl chloride, four parts by volume of oxygen, four parts by volume of nitrogen, and two parts by volume of hydrogen bromide, was conveyed at a space velocity of about 15.5 through the above-mentioned Pyrex glass reactor maintained at a temperature of about 210° C. The conversion to organic acids was equal to about 21%, while that to carbonylic compounds (including chlor-ketones) was equal to about 17%. The results of an analysis of the organic acid fraction are presented below together with the theoretical data for beta-chlor-acrylic and mono-chlor-pyruvic acids:

|  | Found | Theoretical for— | |
| --- | --- | --- | --- |
|  |  | Beta-chlor-acrylic acid | Mono-chlor-pyruvic acid |
| Per cent carbon | 30.5 | 33.8 | 29.4 |
| Per cent hydrogen | 3.0 | 2.82 | 2.45 |
| Per cent chlorine | 31.7 | 33.4 | 29.0 |
| Equiv. weight | 118 | 106.5 | 122.5 |
| Bromine number | 22 | 150 | 0 |
| Ionization constant | $1.6 \times 10^{-4}$ |  |  |

The organic acid fraction reacted with dinitrophenyl hydrazine to give an orange-colored hydrazone; the organic acid fraction also reduced ammoniacal silver. These data indicate that the aforementioned organic acid fraction predominated in a keto-acid which at least had characteristics similar to those of mono-chlor-pyruvic acid.

We claim as our invention:

1. A process for the production of beta-brom-acrylic acid which comprises subjecting a vaporous mixture containing substantial amounts of allyl bromide and of oxygen, at substantially atmospheric pressure and at a temperature of about 200° C., to the action of hydrogen bromide, effecting the reaction for a period of time sufficient to effect the controlled catalytic oxidation of the allyl bromide, and recovering beta-brom-acrylic acid from the reaction mixture thus formed.

2. The process according to claim 1, wherein an inert diluent is employed as a carrier for the allyl bromide.

3. A process for the production of beta-brom-acrylic acid which comprises subjecting a vaporous mixture containing substantial amounts of allyl bromide and of oxygen to the action of hydrogen bromide at a temperature of between about 100° C. and the temperature at which spontaneous combustion of the mixture occurs, effecting the reaction for a period of time sufficient to effect the controlled catalytic oxidation of the allyl bromide, and recovering beta-brom-acrylic acid from the reaction mixture thus formed.

4. A process for the production of a halo-substituted acrylic acid and of the corresponding halo-substituted keto-acids which comprises subjecting a vaporous mixture of an allyl halide and of oxygen to the action of hydrogen bromide at a temperature of between about 100° C. and the temperature at which spontaneous combustion of the mixture occurs, and effecting the reaction for a period of time sufficient to cause the controlled catalytic oxidation of the allyl halide.

5. A process for the production of chlor-crotonic acid and diacetyl which comprises subjecting a vaporous mixture containing substantial amounts of 2-chlor-butene-2 and of oxygen, at substantially atmospheric pressure and at a temperature of about 200° C., to the action of hydrogen bromide, effecting the reaction for a period of time sufficient to effect the controlled catalytic oxidation of the 2-chlor-butene-2, and recovering chlor-crotonic acid and diacetyl from the reaction mixture thus formed.

6. The process according to claim 5, wherein an inert diluent is employed as a carrier for the 2-chlor-butene-2.

7. A process for the production of chlor-crotonic acid which comprises subjecting a vaporous mixture containing substantial amounts of 2-chlor-butene-2 and of oxygen to the action of hydrogen bromide at a temperature of between about 100° C. and the temperature at which spontaneous combustion of the mixture occurs, effecting the reaction for a period of time sufficient to effect the controlled catalytic oxidation of the 2-chlor-butene-2, and recovering chlor-crotonic acid from the reaction mixture thus formed.

8. A process for the production of a halo-crotonic acid which comprises subjecting a vaporous mixture of a 2-halo-butene-2 and of oxygen to the action of hydrogen bromide at an elevated temperature which is between about 100° C. and the temperature at which spontaneous combustion of the mixture occurs, effecting the reaction for a period of time sufficient to effect the controlled catalytic oxidation of the 2-halo-butene-2, and recovering the halo-crotonic acid from the reaction mixture thus formed.

9. A process for the production of halogenated unsaturated carboxylic acids which comprises subjecting a vaporous mixture containing oxygen and a mono-halo-substituted olefin to the action of hydrogen bromide at a temperature of between about 100° C. and the tempertaure at which spontaneous combustion of the mixture occurs, and effecting the reaction for a period of time sufficient to effect the controlled catalytic oxidation of the halo-substituted olefin.

10. In a process for the production of desirable halogenated unsaturated and saturated oxygenated compounds, the steps of subjecting the vapors of a halogenated hydrocarbon containing an olefinic linkage between two carbon atoms of aliphatic character to the action of oxygen in the presence of hydrogen bromide, and effecting the reaction at a temperature of between about 100° C. and the temperature at which spontaneous combustion of the mixture occurs.

11. In a process for the production of desirable oxygenated compounds, the steps of subjecting vapors of a compound selected from the class consisting of halo-substituted unsaturated aliphatic and alicyclic hydrocarbons to the action of oxygen in the presence of hydrogen bromide, and effecting the reaction at a temperature of between about 100° C. and the temperature at which spontaneous combustion of the mixture occurs.

12. In a process for the production of desirable oxygenated compounds, the step of subjecting vapors of a halo-substituted unsaturated organic compound to the action of oxygen in the presence of hydrogen bromide and at a temperature of between about 100° C. and the temperature at which spontaneous combustion of the mixture occurs.

13. In a process for the production of desirable oxygenated compounds, the steps of subjecting a halo-substituted unsaturated organic compound to the action of oxygen in the presence of a catalyst selected from the group consisting of hydrogen bromide and compounds capable of yielding hydrogen bromide under the operating conditions, and effecting the oxidation reaction at a temperature of between about 100° C. and the temperature at which spontaneous combustion of the mixture occurs.

HARRY DE V. FINCH.
SEAVER A. BALLARD.